Figure 2:
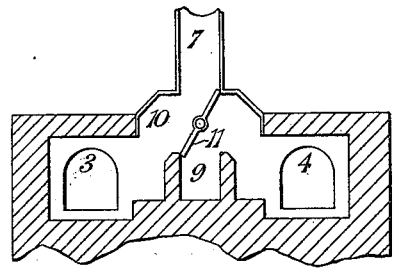

G. H. BAILLIE.
GLASS FURNACE.
APPLICATION FILED FEB. 6, 1911.

1,032,177.

Patented July 9, 1912.

Witnesses

Inventor
G. H. Baillie
per Rogers, Kennedy & Campbell
Attorneys

UNITED STATES PATENT OFFICE.

GRANVILLE HUGH BAILLIE, OF WESTMINSTER, LONDON, ENGLAND.

GLASS-FURNACE.

1,032,177. Specification of Letters Patent. Patented July 9, 1912.

Application filed February 6, 1911. Serial No. 606,714.

*To all whom it may concern:*

Be it known that I, GRANVILLE HUGH BAILLIE, a subject of the King of the United Kingdom of Great Britain and Ireland, and residing at 82 Victoria street, Westminster, London, England, have invented new and useful Improvements in or Relating to Glass-Furnaces, of which the following is a specification.

This invention relates to furnaces for heating the pots from which glass is drawn. These pots are commonly made capable of being turned over, and they cannot in consequence be made to fit the top stone of the furnace accurately, but leave a narrow space around their edges through which the flames from the furnaces can issue. Moreover, the underside of the pot is exposed directly to the flames.

When the gas used for heating the furnace is clean gas, such as natural gas or water gas, there is no objection to the flames issuing around the edges of the pot, and also coming into direct contact with its underside, but if the gas is a producer gas containing tar or other matter in suspension, it is found that the surface of the glass becomes dirty from the tar or other matter. Now in order that the drawn glass may have a good surface, it is imperative that the molten glass be perfectly clean, and it has been found that, even when the pot is made to fit the top stone of the furnace as closely as possible, so that there is very little visible flame issuing around it, sufficient flames or hot gases do actually issue around the edges of the pot to carry with them any dirt there may be in the gas and deposit it on the surface of the glass. For this reason it has been found impossible to draw glass of good quality from invertible pots unless the furnace is heated by clean gas such as natural or water gas, or cleaned producer gas.

The present invention makes it possible to use dirty gas such as ordinary producer gas, and therefore enables the process of drawing glass to be greatly cheapened, since the cheapest form of gas may be used without requiring any cleaning apparatus.

The inventor has found that it is not the dirt which is ordinarily in suspension in the gas within the furnace which finds its way onto the surface of the glass, because that dirt is burned up in the furnace before it issues from it, and moreover the said dirt comes at intervals in rushes, but it is the dirt which has become deposited in the twyers which so reaches the glass, and when a certain amount of this deposit has accumulated, it is carried into the furnace in a mass too large to be burned up and consequently it issues around the pot and falls onto the surface of the glass or is deposited onto the under side of the pot.

In carrying out this invention, the supply of gas through the twyers is stopped before the dirt has accumulated in them in sufficient quantity to be carried into the furnace, and the gas is then supplied through another set of twyers, the first set wherein the dirt had previously accumulated, being then used as outlet ports for the hot gas, so that the accumulation of dirt is burned up or carried out of the furnace and the twyers thereby cleaned. After another given interval the function of the twyers is again inverted, the first set being then used to supply the gas and the second set at outlet ports. In this way the accumulations of dirt are always burned up or carried out of the furnace instead of into it, and the inventor has found that even with tarry producer gas which has undergone no cleaning, the surface of the glass remains quite clean.

The interval which should elapse between the before-mentioned changes in the functions of the respective twyers depends on many factors, such as the amount of dirt in the gas, the velocity of the gas through the twyers, etc., and it is best determined by experiment for any given conditions. Under the conditions obtaining in the furnace in which the invention has been worked, it has been found that an interval of about ten minutes gives very satisfactory results.

It is not necessary to effect the change over a long length of the passages, but it has been found that the longer the length, the longer may be the interval between the change.

The functions of the twyers may be inverted in a number of different ways, and the invention is not restricted to any particular arrangement of twyers, ports, passages or valves for inverting their functions, and any of the valves or devices commonly employed in connection with reversing regenerative furnaces may be used.

It is preferred to make the outflowing gases pass along all passages near the furnace which carry the gas toward the furnace, whether the gas be a mixture of producer gas and air, or producer gas only.

Figure 1:
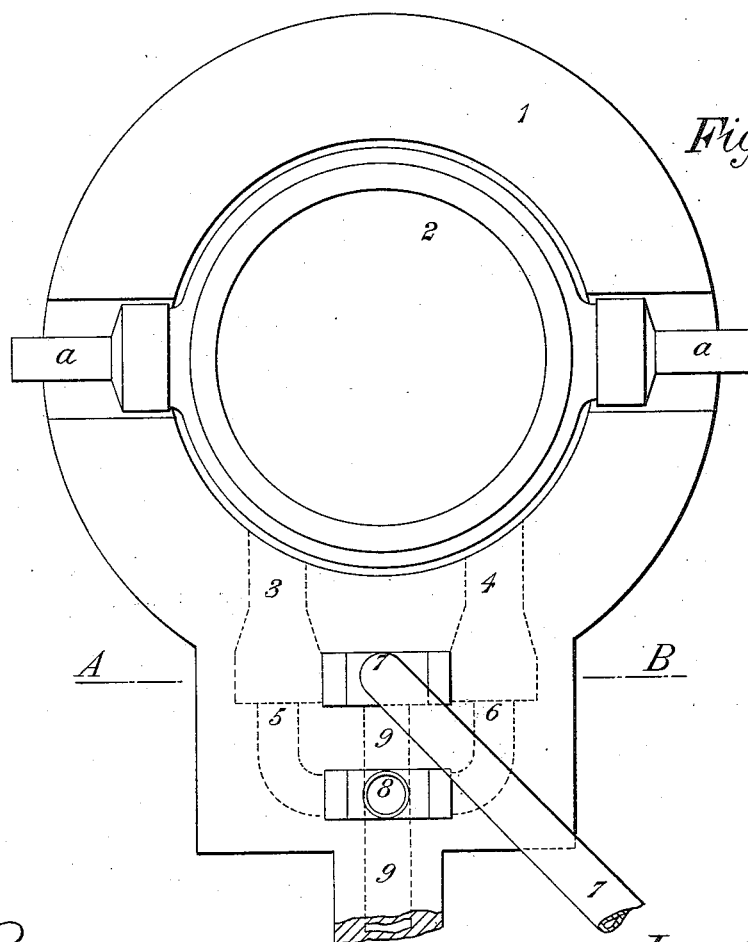

In the accompanying drawings, Figures 1 and 2 show one of the ways in which the invention may be carried out, Fig. 1 being a plan of the furnace and Fig. 2 a section on the line A B of Fig. 1.

The furnace 1, on which the pot 2 is supported in well-known manner by trunnions $a$, is supplied with gas through one of the passages 3, 4 and with air through one of the passages 5, 6, the other of such passages at the same time serving as the outlet for the burned gases. The main gas and air supply passages 7 and 8 respectively, and the flue or passage 9 connected to the chimney lead to two valve chambers, of which only one, 10, is shown in section in Fig. 2. In these chambers work valves 11, only one of which is shown, see Fig. 2.

In the position of the valves shown, gas passes from 7 through valve chamber 10 to the passage 3 and thence into the furnace, and air passes from 8 through a similar valve chamber to the passage 5 and thence to the furnace, while the gases from the furnace pass from 4 and 6 through both of the valves to the flue 9 and thence to the chimney. On turning over the valves 11, the gas from 7 passes through 4 into the furnace, the air from 8 passes through 6 into the furnace, and the gases from the furnace pass through the passages 3 and 5 to the flue 9.

I claim:—

1. In a furnace for keeping hot the glass teemed in a molten condition into an invertible pot from which glass is drawn, the combination with the combustion chamber and two passages communicating therewith, of means adapted to convert each of the said two passages alternately into an inlet for admitting gas into the furnace and an outlet for the escaping gases, so that dirt deposited in a passage which has served as an inlet can be discharged or consumed by the out-flowing gases and thereby prevented from entering the combustion chamber.

2. In a furnace for keeping hot the glass teemed in a molten condition into an invertible pot from which glass is drawn, the combination with the combustion chamber and two passages communicating therewith, of two valve chambers in direct communication with the two passages, a gas supply pipe in direct communication with the respective valve chambers, an outlet flue in open communication with both of the valve chambers and placing them in direct communication with each other, and a valve in each such chamber and adapted to place one of the two passages in communication with the gas and air supply pipes and the other of such passages in communication with the outlet flue, and vice versa.

In witness whereof I have hereunto set my hand in the presence of two witnesses.

GRANVILLE HUGH BAILLIE.

Witnesses:
HENRY HART,
FRANCES ALLIERT CLEMA.

---

Copies of this patent may be obtained for five cents each, by addressing the "Commissioner of Patents, Washington, D. C."